United States Patent
Hayashi et al.

(10) Patent No.: US 10,514,015 B2
(45) Date of Patent: Dec. 24, 2019

(54) CONTROL DEVICE OF INTERNAL COMBUSTION ENGINE

(71) Applicant: Honda Motor Co.,Ltd., Tokyo (JP)

(72) Inventors: Hideyuki Hayashi, Saitama (JP); Yuto Katori, Saitama (JP); Hiroki Miyazono, Saitama (JP); Daisuke Shiomi, Saitama (JP); Kentaro Onuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/024,914

(22) Filed: Jul. 2, 2018

(65) Prior Publication Data

US 2019/0048843 A1 Feb. 14, 2019

(30) Foreign Application Priority Data

Aug. 8, 2017 (JP) ................................. 2017-152957

(51) Int. Cl.
| | | |
|---|---|---|
| *F02P 5/04* | (2006.01) | |
| *F02D 41/00* | (2006.01) | |
| *F02P 5/15* | (2006.01) | |
| *F02D 17/02* | (2006.01) | |
| *F02P 5/152* | (2006.01) | |

(52) U.S. Cl.
CPC .......... *F02P 5/045* (2013.01); *F02D 41/0002* (2013.01); *F02D 41/0025* (2013.01); *F02D 41/0087* (2013.01); *F02P 5/1504* (2013.01); *F02D 17/02* (2013.01); *F02D 2041/0012* (2013.01); *F02D 2200/0414* (2013.01); *F02D 2200/0611* (2013.01); *F02D 2250/21* (2013.01); *F02P 5/1527* (2013.01)

(58) Field of Classification Search
CPC ........ F02P 5/045; F02P 5/1504; F02P 5/1527; F02D 41/0087; F02D 41/0025; F02D 41/0002; F02D 2041/0012; F02D 2250/21; F02D 17/02; F02D 2200/0611; F02D 2200/0414
See application file for complete search history.

(56) References Cited

FOREIGN PATENT DOCUMENTS

| JP | 2016050510 | 4/2016 |
|---|---|---|
| JP | 6020770 | 11/2016 |

OTHER PUBLICATIONS

"Office Action of Japan Counterpart Application", dated Feb. 5, 2019, with English translation thereof, p. 1-p. 4.

*Primary Examiner* — Xiao En Mo
(74) *Attorney, Agent, or Firm* — JCIPRNET

(57) ABSTRACT

A control device of an internal combustion engine is provided. In the case where a switch request for switching from all-cylinder operation to partial-cylinder operation is made, before a switch from the all-cylinder operation to the partial-cylinder operation is executed, an intake air amount increase control increasing an intake air flow rate of an engine by increasing an opening degree of a throttle valve is performed, an ignition timing retardation control retarding an ignition timing is performed, and based on a retardation limit value of the ignition timing at a time point when the switch request is made, a start timing of the intake air amount increase control is changed. As a retardable amount being a difference between an initial ignition timing and the retardation limit value decreases, the start timing of the intake air amount increase control is delayed further.

7 Claims, 6 Drawing Sheets

CONTROL DEVICE OF INTERNAL COMBUSTION ENGINE

CROSS-REFERENCE TO RELATED APPLICATION

This application claims the priority benefit of Japan Application No. 2017-152957, filed on Aug. 8, 2017. The entirety of the above-mentioned patent application is hereby incorporated by reference herein and made a part of this specification.

BACKGROUND

Technical Field

The disclosure relates to a control device of an internal combustion engine having a plurality of cylinders, particularly to a control device of an internal combustion engine, the internal combustion engine being capable of switching between partial-cylinder operation in which some of a plurality of cylinders are operated and all-cylinder operation in which all of the plurality of cylinders are operated.

Related Art

Patent Document 1 shows a control device of an internal combustion engine, the internal combustion engine being capable of switching between partial-cylinder operation in which some of a plurality of cylinders are operated and all-cylinder operation in which all of the plurality of cylinders are operated. In this control device, whether or not a switch request for switching from the all-cylinder operation to the partial-cylinder operation has occurred is judged according to an operation region or a cooling water temperature and so on of the internal combustion engine. When the switch request has occurred, a switch control controlling an opening degree of a throttle valve to an increasing side from that during the all-cylinder operation, and retarding an ignition timing to a switch control value of a retarding side from that during the all-cylinder operation is executed.

In this case, the switch control value of the ignition timing is set to a retardation ignition timing corresponding to an increase in an intake air amount associated with the increase in the opening degree of the throttle valve or an ignition timing on an more advanced side within a predetermined retardation limit ignition timing. The retardation ignition timing is an ignition timing for suppressing an increase in an output torque associated with the increase in the intake air amount. During execution of the switch control, when the intake air amount has reached a value for the partial-cylinder operation, or when the ignition timing has been maintained at a retardation limit value for a predetermined period of time, the partial-cylinder operation of the internal combustion engine is started.

PATENT DOCUMENTS

[Patent Document 1] Japanese Laid-open No. No 2016-50510

In the control device of Patent Document 1, depending on an operation state of the internal combustion engine when the switch control is executed (for example, when an exhaust gas recirculation amount is large), there is a possibility that a retardable amount from a normal ignition timing during the all-cylinder operation to the switch control value may decrease. In such cases, the increase in the output torque associated with the increase in the intake air amount cannot be properly suppressed any more, there are fears that the output torque increases before the switch from the all-cylinder operation to the partial-cylinder operation and a change in the output torque at the time of execution of the switch may increase.

SUMMARY

The disclosure is to provide a control device of an internal combustion engine, capable of properly suppressing a change in the output torque when the internal combustion engine switches from the all-cylinder operation to the partial-cylinder operation.

One embodiment of the disclosure provides a control device of an internal combustion engine. The internal combustion engine includes a plurality of cylinders, an intake air amount change member for changing an intake air amount, and an ignition member performing ignition of a mixture of a fuel and air, the fuel being supplied into a combustion chamber of the cylinders, and the internal combustion engine is capable of switching between partial-cylinder operation in which some of the plurality of cylinders are operated and all-cylinder operation in which all of the plurality of cylinders are operated. The control device includes a transient control member. In the case where a switch request for switching from the all-cylinder operation to the partial-cylinder operation is made, before executing a switch from the all-cylinder operation to the partial-cylinder operation, the transient control member performs an intake air amount increase control controlling the intake air amount change member so as to increase the intake air amount of the internal combustion engine, and performs an ignition timing retardation control retarding an ignition timing of the ignition member. The transient control member changes a start timing of the intake air amount increase control based on a retardation limit value of the ignition timing at a time point when the switch request is made.

Another embodiment of the disclosure provides a control device of an internal combustion engine. The internal combustion engine includes a plurality of cylinders, an intake air amount change member for changing an intake air amount, and an ignition member performing ignition of a mixture of a fuel and air, the fuel being supplied into a combustion chamber of the cylinders, and the internal combustion engine is capable of switching between partial-cylinder operation in which some of the plurality of cylinders are operated and all-cylinder operation in which all of the plurality of cylinders are operated. The control device includes a transient control member. In the case where a switch request for switching from the all-cylinder operation to the partial-cylinder operation is made, before executing a switch from the all-cylinder operation to the partial-cylinder operation, the transient control member performs an intake air amount increase control controlling the intake air amount change member so as to increase the intake air amount of the internal combustion engine, and performs an ignition timing retardation control retarding an ignition timing of the ignition member. The transient control member calculates an output torque reduction ratio of the internal combustion engine that should be achieved by the ignition timing retardation control, and calculates a target retardation ignition timing of the ignition timing retardation control according to the output torque reduction ratio. When a retardation limit value of the ignition timing at a time point when the switch request is made is on an more advanced side from the target retardation ignition timing, the start timing of the intake air amount increase control is delayed.

DESCRIPTION OF THE EMBODIMENTS

Hereinafter, embodiments of the disclosure are explained with reference to the drawings.

Figure 1:
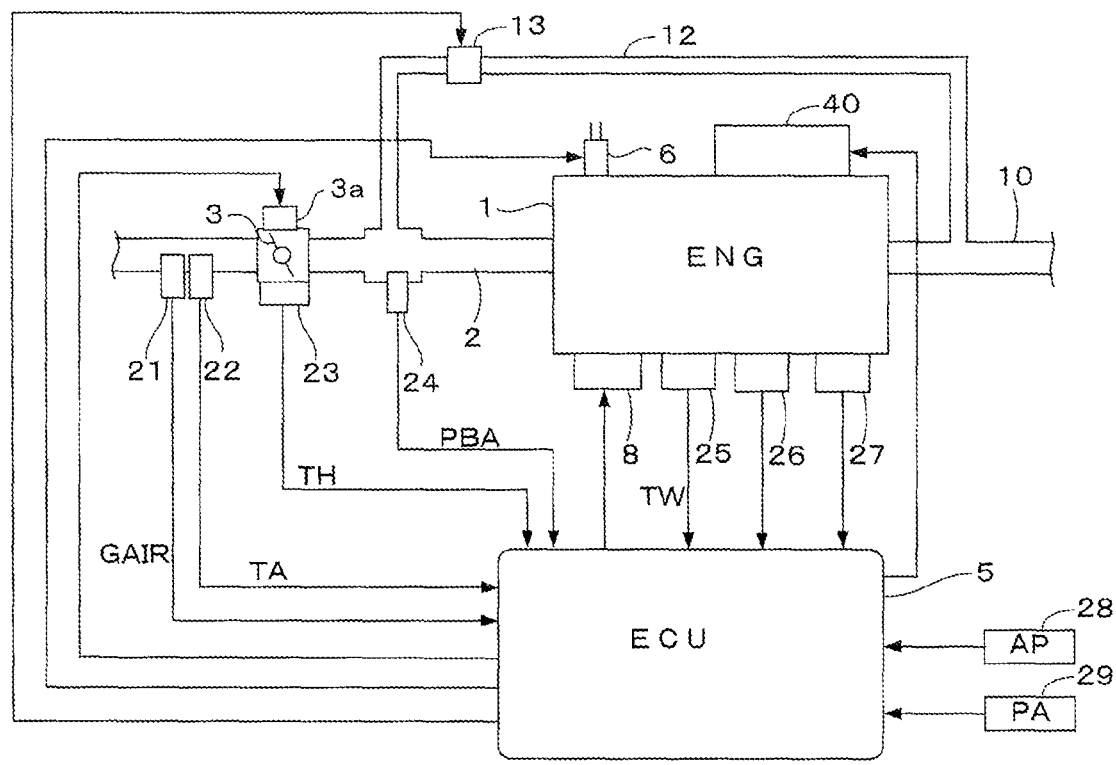
FIG. 1 illustrates a configuration of an internal combustion engine and a control device thereof according to an embodiment of the disclosure.

FIG. 1 illustrates a configuration of an internal combustion engine and a control device thereof according to an embodiment of the disclosure. An internal combustion engine (hereinafter "engine") 1 shown in FIG. 1 has six cylinders, for example, and an injector 6 directly injecting a fuel into a combustion chamber is provided in each of the cylinders. Operation of the injector 6 is controlled by an electronic control unit (hereinafter "ECU") 5. In addition, a spark plug 8 is installed in each of the cylinders of the engine 1, wherein an ignition timing of the spark plug 8 is controlled by the ECU 5. A throttle valve 3 is disposed in an intake passage 2 of the engine 1.

An intake air flow rate sensor 21 detecting an intake air flow rate GAIR of the engine 1, an intake temperature sensor 22 detecting an intake temperature TA, a throttle valve opening degree sensor 23 detecting a throttle valve opening degree TH, an intake pressure sensor 24 detecting an intake pressure PBA, a cooling water temperature sensor 25 detecting an engine cooling water temperature TW, a crank angle position sensor 26 detecting a rotational angle of a crank shaft (not illustrated) of the engine 1, a knock sensor 27 detecting knocking occurring in the engine 1, an accelerator sensor 28 detecting an accelerator pedal operation amount AP of a vehicle driven by the engine 1, an atmospheric pressure sensor 29 detecting atmospheric pressure PA, and other sensors (for example, an air-fuel ratio sensor detecting an air-fuel ratio AF, a cam angle sensor detecting a rotational angle of a cam shaft, a vehicle speed sensor and so on) not illustrated, are connected to the ECU 5, and detection signals of these sensors are provided to the ECU 5. The crank angle position sensor 26 outputs a plurality of pulse signals indicating crank angle positions, wherein the pulse signals are used for controlling various timings such as fuel injection timing, ignition timing and so on as well as for detecting an engine rotation number (rotational speed) NE.

The engine 1 includes an exhaust gas recirculation device, wherein the exhaust gas recirculation device has an exhaust gas recirculation passage 12 connected to an exhaust passage 10 and the intake passage 2, and an exhaust gas recirculation control valve (hereinafter "EGR valve") 13 adjusting a flow rate of exhaust gas passing through the exhaust gas recirculation passage 12. Operation of the EGR valve 13 is controlled by the ECU 5.

The engine 1 includes a cylinder halting mechanism 40 temporarily halting operation of the cylinders #1 to #3, wherein the engine 1 is configured switchable between partial-cylinder operation in which only the cylinders #4 to #6 are operated and all-cylinder operation in which all of the cylinders are operated, according to an operation state of the engine 1. The cylinder halting mechanism 40 may be a known mechanism such as one shown in, for example, Patent Document 1 and Japanese Laid-open No. 2004-251227 and so on. In the partial-cylinder operation, an intake valve and an exhaust valve of a halted cylinder are maintained in a valve-closed state. The ECU 5 performs a switch control between the partial-cylinder operation and the all-cylinder operation. The partial-cylinder operation is executed when, for example, in a cruise state in which the vehicle driven by the engine 1 travels at a relatively low and nearly constant vehicle speed.

The ECU 5 has a well-known configuration including a central processing unit (CPU), a memory, input and output circuits and so on, and performs a fuel injection control by means of the injector 6, an ignition timing control by means of the spark plug 8, an intake air flow rate control by means of an actuator 3a and the throttle valve 3, a recirculation exhaust gas flow rate control by means of the EGR valve 13, and the switch control between the partial-cylinder operation and the all-cylinder operation by means of the cylinder halting mechanism 40, according to the engine operation state (mainly the engine rotation number NE and a target torque TRQCMD). The target torque TRQCMD is calculated mainly according to the accelerator pedal operation amount AP, and is calculated so as to increase as the accelerator pedal operation amount AP increases. In addition, a target intake air flow rate GAIRCMD is calculated according to the target torque TRQCMD, and is calculated so as to be nearly proportional to the target torque TRQCMD. The intake air flow rate control driving the throttle valve 3 by the actuator 3a is performed so that the actual intake air flow rate GAIR matches the target intake air flow rate GAIRCMD. Since the amount of the air sucked in the combustion chamber per combustion cycle increases or decreases with an increase or decrease in the intake air flow rate due to the intake air flow rate control, the intake air flow rate control is also referred to as "intake air amount control."

A fuel injection amount (mass) GINJ of the injector 6 is controlled by correcting a basic fuel amount GINJB, which is calculated using the intake air flow rate GAIR, by using a correction coefficient such as an air-fuel ratio correction coefficient KAF corresponding to the air-fuel ratio AF detected by the air-fuel ratio sensor, or the like. Moreover, the fuel injection amount GINJ is converted into a valve opening time TOUT of the injector 6 according to a fuel pressure PF, density of the fuel and so on, using a known method, and is controlled so that the amount of the fuel supplied into the combustion chamber per cycle is the fuel injection amount GINJ.

Figure 2:
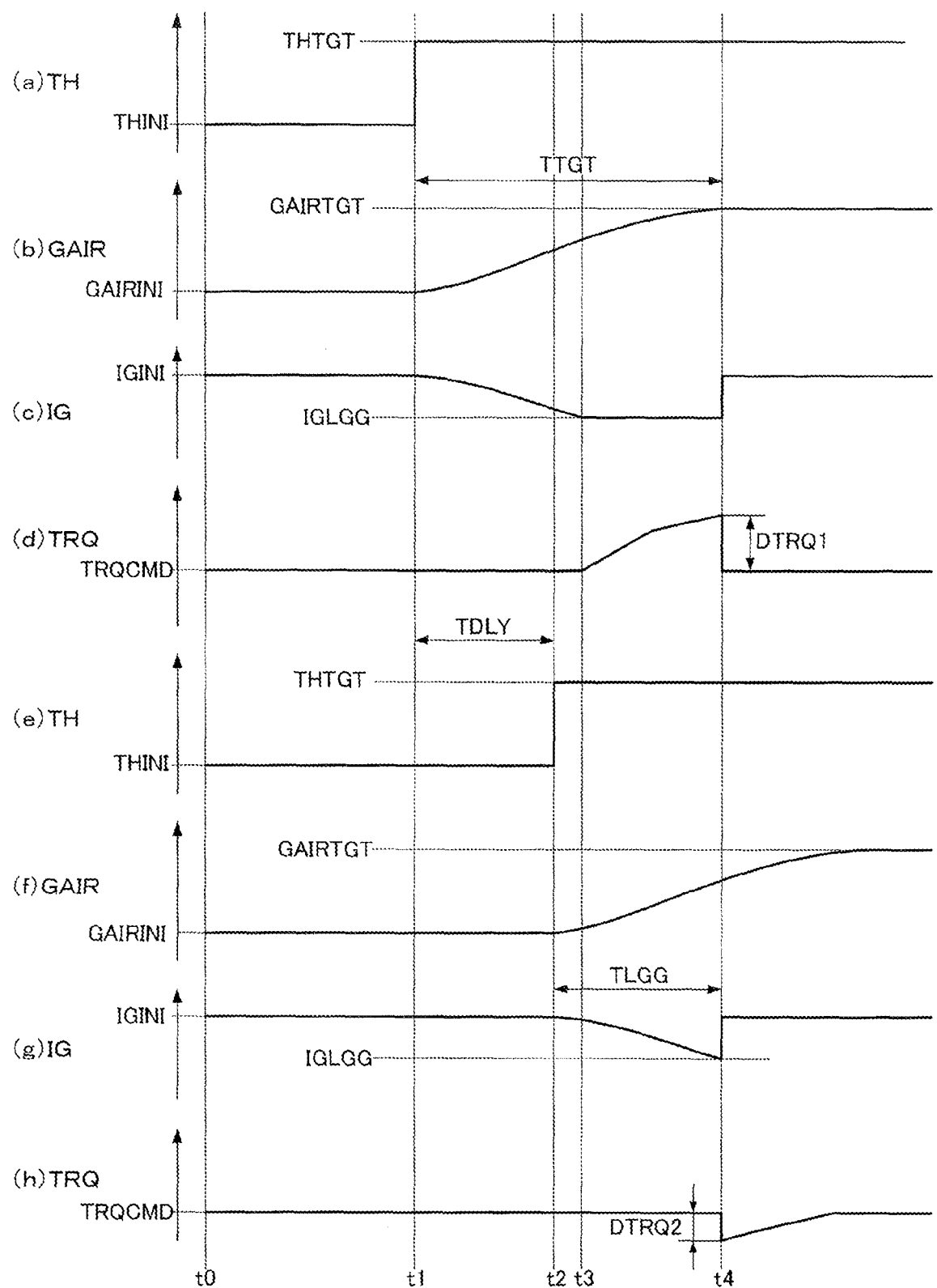
FIG. 2 is a time chart for explaining a transient control when a switch from all-cylinder operation to partial-cylinder operation is performed.

FIG. 2 is a time chart for explaining an outline of the disclosure, i.e., a transient control when a switch (hereinafter "transition-to-partial-cylinder-operation switch") from the all-cylinder operation to the partial-cylinder operation is performed. In this transient control, before the transition-to-partial-cylinder-operation switch is performed, by opening the throttle valve 3 (stepwise increasing the throttle valve opening degree TH) to increase the intake air flow rate GAIR and by retarding an ignition timing IG from an initial ignition timing IGINI (the ignition timing at a time point when a request for the transition-to-partial-cylinder-operation switch is made), an output torque TRQ of the engine 1 is maintained as constant as possible, and a control returning (advancing) the ignition timing IG to the initial ignition timing IGINI is performed at a time point when the transition-to-partial-cylinder-operation switch is performed. Accordingly, a torque change at the time point when the transition-to-partial-cylinder-operation switch is performed is suppressed.

FIG. 2(a) to (d) correspond to an operation example in which a valve-opening timing tTHO of the throttle valve 3 is set to time t1; FIG. 2(e) to (h) correspond to an operation example in which the valve-opening timing tTHO is set to time t2 delayed from time t1 by a delay time TDLY. Moreover, time t0 indicates a time point when it is judged from the operation state of the engine 1 that it is possible to execute the partial-cylinder operation and a switch request for switching from the all-cylinder operation to the partial-cylinder operation is made.

When the valve-opening timing tTHO is time t1, a valve-opening control stepwise increasing the throttle valve opening degree TH from an initial opening degree THINI to a target opening degree at the time of switching THTGT is executed at time t1. As a result, the intake air flow rate GAIR starts to increase from an initial value GAIRINI, reaches a target intake air flow rate at the time of switching GAIRTGT at time t4, and the transition-to-partial-cylinder-operation switch is executed. The target intake air flow rate at the time of switching GAIRTGT is an intake air flow rate at which the target torque TRQCMD can be achieved during execution of the partial-cylinder operation (by operation with three cylinders).

The ignition timing IG is gradually retarded in order to maintain the output torque TRQ of the engine 1, which depends on the increase in the intake air flow rate GAIR, at the target torque TRQCMD. At time t3, since the ignition timing IG reaches a retardation limit value IGLGG, no further retardation is performed, and the ignition timing IG is maintained at the retardation limit value IGLGG until time t4. As a result, although the output torque TRQ is maintained at the target torque TRQCMD until time t3, since it starts to increase from time t3, an acceleration unintended by a driver occurs; also, when the transition-to-partial-cylinder-operation switch is executed at time t4, a torque level difference DTRQ1 in a decreasing direction occurs. The retardation limit value IGLGG is an ignition timing at which combustion becomes unstable when the ignition timing IG is more retarded than the retardation limit value IGLGG, and varies depending on the engine rotation number NE, an exhaust gas recirculation rate REGR, the intake temperature TA, or an octane number RON of a gasoline in use, and so on.

By contrast, when the valve-opening timing tTHO is time t2, the valve-opening control of the throttle valve 3 is executed at time t2, and from time t2, the intake air flow rate GAIR starts to increase, and the ignition timing IG is gradually retarded. At time t4, since the ignition timing IG reaches the retardation limit value IGLGG, the transition-to-partial-cylinder-operation switch is executed at this time point. The output torque TRQ is maintained at the target torque TRQCMD until time t4, and since the intake air flow rate GAIR does not reach the target intake air flow rate at the time of switching GAIRTGT at time t4, a torque level difference DTRQ2 in the decreasing direction occurs; however, DTRQ2<DTRQ1, and a torque level difference (torque change) occurring at the time of execution of the switch can be reduced.

In the present embodiment, the delay time TDLY is set to a period of time equivalent to a difference between time (target intake air flow rate arrival time) TTGT and time (retardation limit value arrival time) TLGG, the time TTGT being time required for the intake air flow rate GAIR to reach from the initial value (hereinafter "initial intake air flow rate") GAIRINI to the target intake air flow rate at the time of switching GAIRTGT and the time TLGG being time required for the ignition timing IG to reach from the initial value IGINI to the retardation limit value IGLGG.

Figure 3:
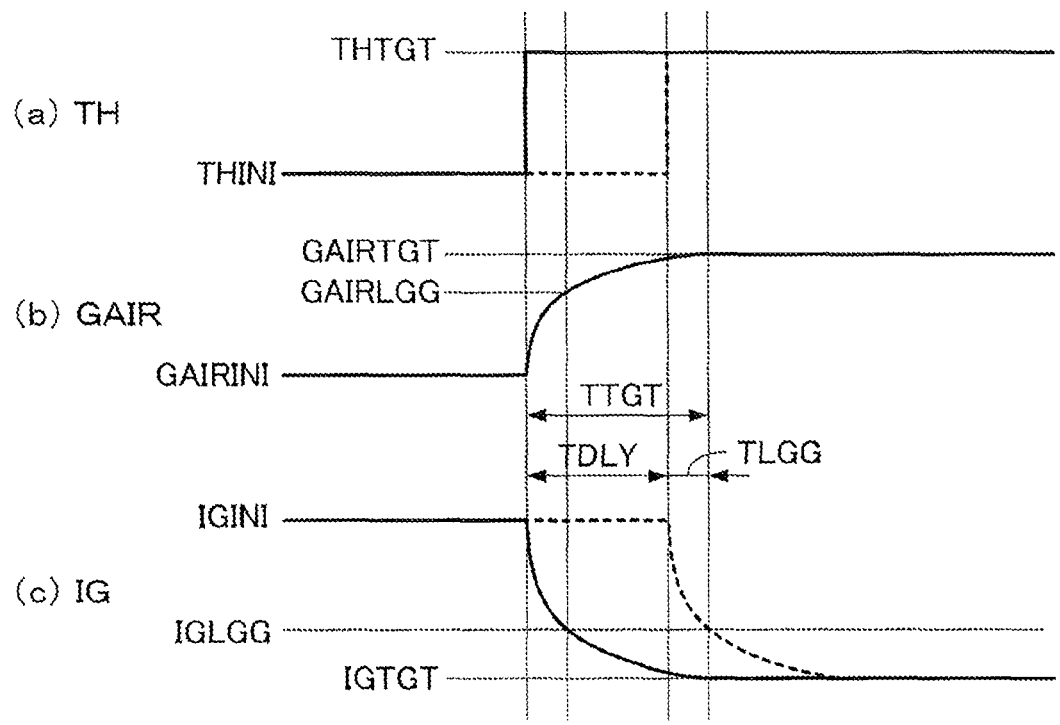
FIG. 3 is a time chart for explaining a calculation method of a delay time (TDLY) delaying a valve opening timing of a throttle valve in the transient control.

FIG. 3 is a time chart for explaining a calculation method of the delay time TDLY, wherein in the present embodiment, the delay time TDLY is calculated by approximating an increase characteristic of the intake air flow rate GAIR with a first-order lag characteristic, calculating the retardation limit value arrival time TLGG and the target intake air flow rate arrival time TTGT by using an equation (hereinafter "first-order lag equation") indicating the first-order lag characteristic, and subtracting the retardation limit value arrival time TLGG from the target intake air flow rate arrival time TTGT. A specific calculation method is described later with reference to FIG. 7. IGTGT shown in FIG. 3 represents a target retardation ignition timing at the time of switching. When the ignition timing IG can be retarded to the target retardation ignition timing at the time of switching IGTGT, since it is possible to set the torque level difference to "0" at the time point when the transition-to-partial-cylinder-operation switch is executed, a control delaying the valve-opening timing of the throttle valve 3 is not performed. GAIRLGG shown in FIG. 3 is equivalent to the intake air flow rate GAIR at a time point when the ignition timing IG has been retarded to the retardation limit value IGLGG, and is referred to as "retardation limit intake air flow rate GAIRLGG" in the following explanation.

Figure 4:
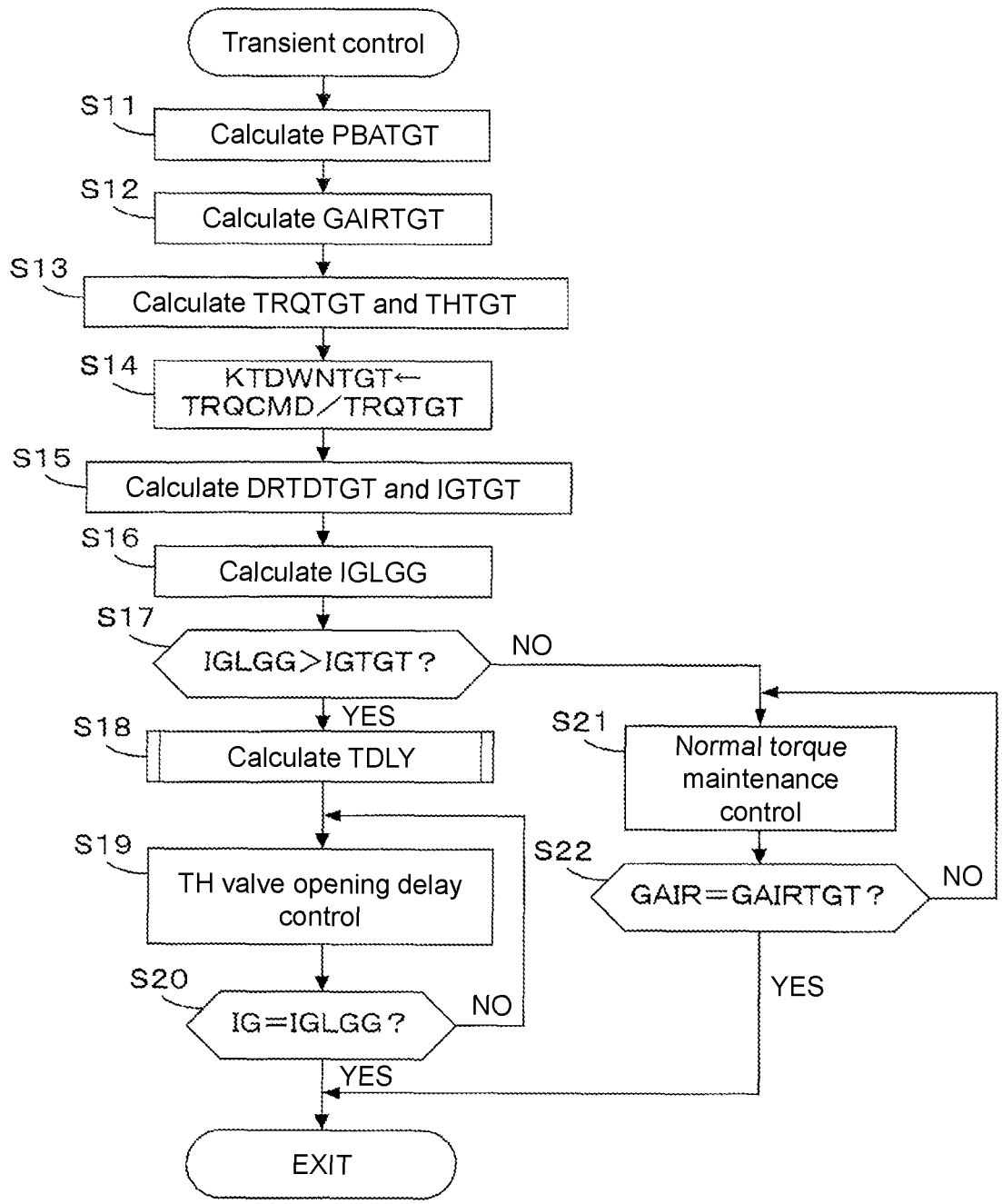
FIG. 4 is a flowchart for explaining a process of executing the transient control.

FIG. 4 is a flowchart for explaining a process of executing the above-mentioned transient control. In step S11, an intake pressure (target intake pressure at the time of switching) PBATGT required for setting the torque change to "0" at a time point (operation switching time point) when the partial-cylinder operation starts is calculated. The target intake pressure at the time of switching PBATGT is calculated by retrieving a PBATGT table set in advance according to an intake pressure PBAINI at a time point (hereinafter "switch request time point") when a switch request for switching to the partial-cylinder operation is made. The target intake pressure at the time of switching PBATGT is set so as to increase as the intake pressure PBA increases.

In step S12, the target intake pressure at the time of switching PBATGT is converted into the target intake air flow rate at the time of switching GAIRTGT by using a PBA-GAIR conversion map. The PBA-GAIR conversion map is basically set so that the intake air flow rate GAIR increases as the intake pressure PBA increases and as the engine rotation number NE increases.

In step S13, the target intake air flow rate at the time of switching GAIRTGT is converted into a target torque at the time of switching TRQTGT by using a GAIR-TRQ conversion table, and the target opening degree at the time of switching THTGT is calculated.

The GAIR-TRQ conversion table is basically set so that the output torque TRQ increases as the intake air flow rate GAIR increases, in which a plurality of tables are provided corresponding to the engine rotation number NE. A correction corresponding to the exhaust gas recirculation rate REGR (an exhaust gas recirculation rate including external exhaust gas recirculation via the exhaust gas recirculation device, and internal exhaust gas recirculation) is performed. The target opening degree at the time of switching THTGT corresponding to the target intake air flow rate at the time of switching GAIRTGT is calculated using a known method employing a relationship between a flow rate of gas passing through a nozzle and an effective opening degree of the nozzle.

In step S14, a target torque reduction ratio at the time of switching KTDWNTGT is calculated by applying the target torque TRQCMD at the switch request time point and the target torque at the time of switching TRQTGT to the following equation (1).

$$KTDWNTGT=TRQCMD/TRQTGT \quad (1)$$

Figure 6:
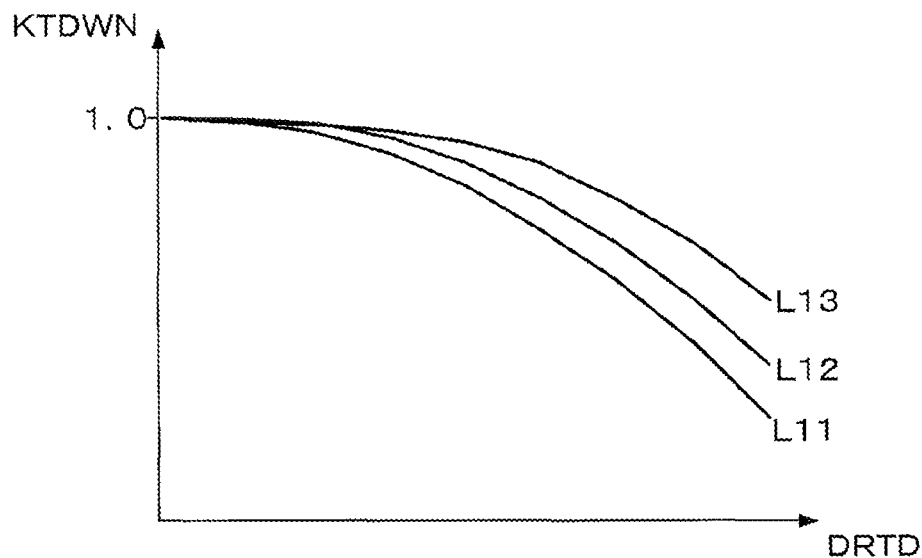
FIG. 6 illustrates a relationship between a retardation amount (DRTD) of an ignition timing and an engine output torque reduction ratio (KTDWN).

In step S15, according to the target torque reduction ratio at the time of switching KTDWNTGT, a KTDWN map shown in FIG. 6 is reversely retrieved to calculate a target retardation amount at the time of switching DRTDTGT of the ignition timing IG. In FIG. 6, curves L11 to L13 respectively correspond to predetermined engine rotation numbers NE11, NE12 and NE13 (NE11<NE12<NE13). The KTDWN map is set so that a torque reduction ratio KTDWN decreases as a retardation amount DRTD increases, and the torque reduction ratio KTDWN increases as the engine rotation number NE increases, wherein the torque reduction ratio KTDWN has a value of "0" to "1."

The initial ignition timing IGINI and the target retardation amount at the time of switching DRTDTGT are applied to the following equation (2), and the target retardation ignition timing at the time of switching IGTGT is calculated. The ignition timing IG is defined by an advance amount from a compression top dead center, and by subtracting the target retardation amount at the time of switching DRTDTGT from the initial ignition timing IGINI, the target retardation ignition timing at the time of switching IGTGT is obtained.

$$IGTGT=IGINI-DRTDTGT \quad (2)$$

In step S16, the retardation limit value IGLGG is calculated according to the exhaust gas recirculation rate REGR, the engine rotation number NE, and the intake temperature TA. The retardation limit value IGLGG is calculated so as to increase (become a value on the more advanced side) as the exhaust gas recirculation rate REGR increases, as the engine rotation number NE increases, and as the intake temperature TA lowers.

In step S17, whether or not the retardation limit value IGLGG is greater (on the more advanced side) than the target retardation ignition timing at the time of switching IGTGT is discriminated. When the answer thereto is negative (NO), it is possible to retard the ignition timing IG to the target retardation ignition timing at the time of switching IGTGT, and the torque level difference at the operation switching time point does not occur. Accordingly, by directly opening the throttle valve 3 and retarding the ignition timing IG as the intake air flow rate GAIR increases, a normal torque maintenance control maintaining the output torque TRQ at the target torque TRQCMD is executed (step S21). In step S22, whether or not the intake air flow rate GAIR has reached the target intake air flow rate at the time of switching GAIRTGT is discriminated. While the answer thereto is negative (NO), the normal torque maintenance control is continued; when the answer in step S22 becomes positive (YES), the present process is ended and the switch to the partial-cylinder operation is performed by other processes not illustrated.

Figure 5:
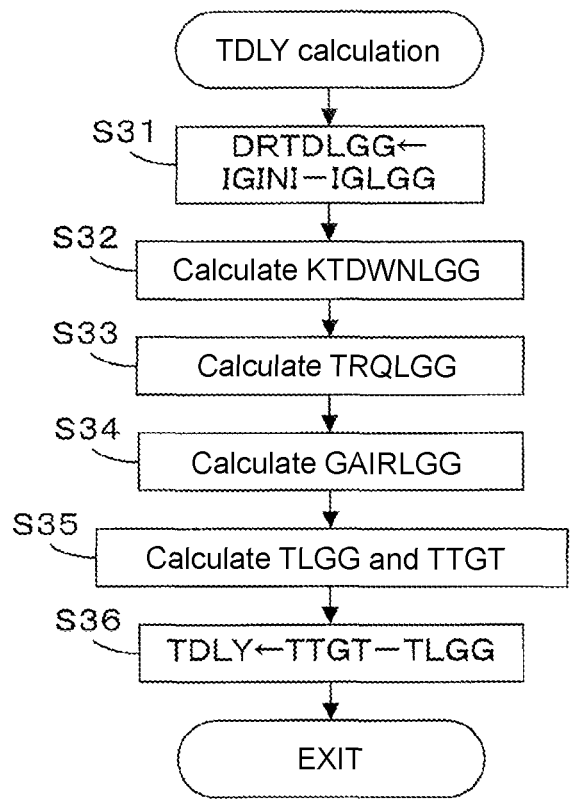
FIG. 5 is a flowchart for explaining a process of calculating the delay time (TDLY).

When the answer in step S17 is positive (YES), since this situation corresponds to the case of the operation example shown in FIG. 2, a TDLY calculation process shown in FIG. 5 is executed to calculate the delay time TDLY. In step S19, a TH valve opening delay control in which the throttle valve 3 is opened at a timing delayed from a throttle valve opening timing of the normal torque maintenance control by the delay time TDLY, and after that, realizing the intake pressure PBA that maintains the output torque TRQ at the target torque TRQCMD is executed.

In step S20, whether or not the ignition timing IG has reached the retardation limit value IGLGG is discriminated, and while the answer thereto is negative (NO), the TH valve opening delay control is continued. When the answer in step S20 becomes positive (YES), the present process is ended and the switch to the partial-cylinder operation is performed by other processes not illustrated.

FIG. 5 is a flowchart for explaining the TDLY calculation process executed in step S18 in FIG. 4.

In step S31, by subtracting the retardation limit value IGLGG from the initial ignition timing IGINI, a retardable amount DRTDLGG is calculated. In step S32, the KTDWN map shown in FIG. 6 is retrieved according to the retardable amount DRTDLGG and the engine rotation number NE, and a retardation limit torque reduction ratio KTDWNLGG is calculated.

In step S33, the target torque at the time of switching TRQTGT and the retardation limit torque reduction ratio KTDWNLGG are applied to the following equation (3) to calculate a retardation limit torque reducible amount DTRQLGG. The retardation limit torque reducible amount DTRQLGG and the target torque TRQCMD are applied to the following equation (4) to calculate a retardation limit torque TRQLGG. The retardation limit torque TRQLGG is the output torque TRQ obtained in the case where the ignition timing IG is maintained at an optimal ignition timing IGOPT (an ignition timing at which the output torque TRQ becomes the maximum) at the time point when the ignition timing IG is retarded to the retardation limit value IGLGG.

$$DTRQLGG=TRQTGT \times (1-KTDWNLGG) \quad (3)$$

$$TRQLGG=TRQCMD+DTRQLGG \quad (4)$$

In step S34, the retardation limit torque TRQLGG is converted into the retardation limit intake air flow rate GAIRLGG by using the above-mentioned GAIR-TRQ conversion table. In step S35, the retardation limit value arrival time TLGG and the target intake air flow rate arrival time TTGT are calculated using a method employing the first-order lag equation. In step S36, by subtracting the retardation limit value arrival time TLGG from the target intake air flow rate arrival time TTGT, the delay time TDLY is calculated. The retardation limit value arrival time TLGG is shortened as the retardable amount DRTDLGG decreases. Thus, the delay time TDLY is set so as to increase as the retardable amount DRTDLGG decreases.

Figure 7:
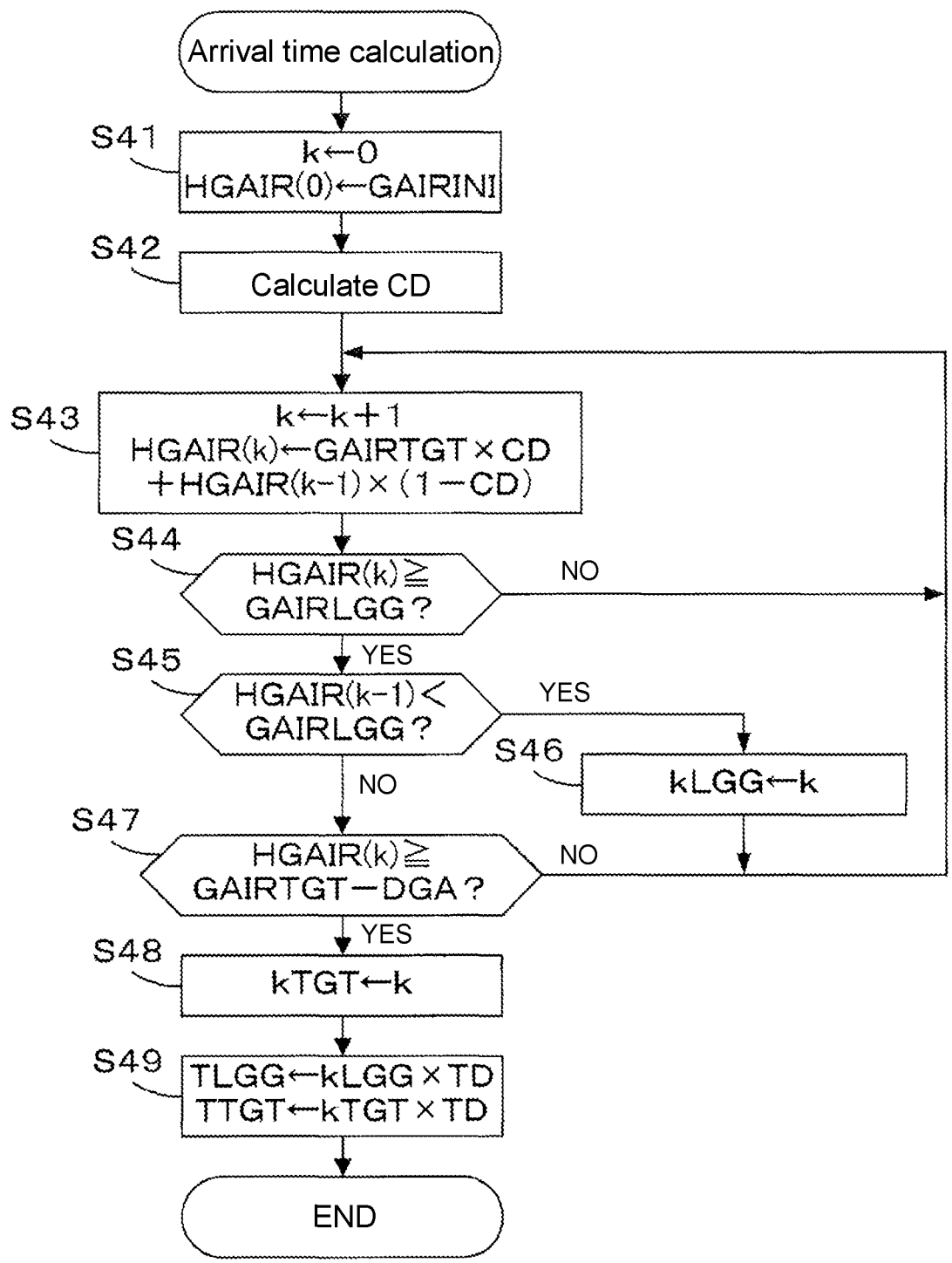
FIG. 7 is a flowchart showing an example of a calculation method of an arrival time (TLGG, TTGT) used for calculating the delay time (TDLY).

FIG. 7 is a flowchart showing an example of a calculation method of the retardation limit value arrival time TLGG and the target intake air flow rate arrival time TTGT. A parameter k used in this process indicates a discrete time discretized with a period TD.

In step S41, the discrete time k is set to "0" and an estimated intake air flow rate HGAIR(0) is set to the initial intake air flow rate GAIRINI. In step S42, a lag coefficient CD applied to a first-order lag equation (5) shown below is calculated according to the engine rotation number NE. The lag coefficient CD has a value of "0" to "1" and is set to increase as the engine rotation number NE increases.

In step S43, the discrete time k is increased by "1," and an estimated intake air flow rate HGAIR(k) is calculated according to the following first-order lag equation (5). HGAIR(0) set in step S41 is applied as an initial value of HGAIR(k−1).

$$HGAIR(k)=GAIRTGT \times CD+HGAIR(k-1) \times (1-CD) \quad (5)$$

In step S44, whether or not the calculated estimated intake air flow rate HGAIR(k) is equal to or greater than the retardation limit intake air flow rate GAIRLGG is discriminated. The answer thereto at first is negative (NO), and the process returns to step S43. When the answer in step S44 is positive (YES), whether or not the previous value HGAIR (k−1) of the estimated intake air flow rate is less than the retardation limit intake air flow rate GAIRLGG is discriminated (step S45). When the answer thereto is positive (YES), i.e., immediately after the estimated intake air flow rate HGAIR has become equal to or greater than the retardation limit intake air flow rate GAIRLGG, the discrete time k at that time is stored as a discrete retardation limit arrival time kLGG (step S46). After that, the process returns to step S43.

When the answer in step S45 is negative (NO), whether or not the estimated intake air flow rate HGAIR(k) is equal to or greater than a value obtained by subtracting a predetermined minute amount DGA from the target intake air flow rate at the time of switching GAIRTGT is discriminated (step S47). The answer in step S47 at first is negative (NO), and the process returns to step S43.

When the answer in step S47 becomes positive (YES), the discrete time k at that time is stored as a discrete target intake air flow rate arrival time kTGT (step S48). In step S49, by multiplying the discrete retardation limit arrival time kLGG and the discrete target intake air flow rate arrival time kTGT by the period TD, the retardation limit value arrival time TLGG and the target intake air flow rate arrival time TTGT are calculated.

By setting a repetition period of steps S43 to S47 to a relatively short time, the retardation limit value arrival time TLGG and the target intake air flow rate arrival time TTGT can be calculated in a short time.

As mentioned above, in the present embodiment, in the case where the switch request for switching from the all-cylinder operation to the partial-cylinder operation is made, before the switch from the all-cylinder operation to the partial-cylinder operation is executed, an intake air amount increase control increasing the intake air flow rate GAIR of the engine 1 by increasing the opening degree TH of the throttle valve 3 is performed, and an ignition timing retardation control retarding the ignition timing IG is performed, and based on the retardation limit value IGLGG of the ignition timing at the time point when the switch request is made, a start timing (t2 in FIG. 2) of the intake air amount increase control is changed. When a difference (i.e., the retardable amount DRTDLGG of the ignition timing) between the initial ignition timing IGINI (the ignition timing at the time point when the switch request is made) and the retardation limit value IGLGG is small, an increase in the output torque TRQ associated with an increase in the intake air flow rate GAIR cannot be sufficiently suppressed any more by retarding the ignition timing IG. In such cases, by changing the start timing of the intake air amount increase control, it becomes possible to suppress a change in the output torque at the time point when the switch from the all-cylinder operation to the partial-cylinder operation is executed.

In addition, in the present embodiment, the retardation limit value IGLGG is calculated using the intake temperature TA, the exhaust gas recirculation rate REGR, and the engine rotation number NE. Since the retardation limit value IGLGG varies depending on the intake temperature TA, the exhaust gas recirculation rate REGR and the engine rotation number NE, by calculating the retardation limit value IGLGG by using these parameters, accidental fires that may happen due to excessive retardation of the ignition tinning IG can be reliably prevented.

In addition, the difference between the retardation limit value IGLGG and the initial ignition timing IGINI is calculated as the retardable amount DRTDLGG, and the start timing of the intake air amount increase control is changed according to the retardable amount DRTDLGG. By calculating the difference between the retardation limit value IGLGG and the initial ignition timing IGINI as the retardable amount DRTDLGG, a retardable amount of the ignition timing IG at the time point when the switch request for switching to the partial-cylinder operation is made is calculated with high accuracy, and the change of the start timing of the intake air amount increase control can be properly performed.

In addition, since a torque amount that can be reduced by retardation of the ignition timing IG decreases as the retardable amount DRTDLGG decreases, the increase in the output torque TRQ due to the intake air amount increase control starts early, and the torque change at the time point (t6 in FIG. 2) of switching from the all-cylinder operation to the partial-cylinder operation increases. Accordingly, by delaying the start timing of the intake air amount as the retardable amount DRTDLGG decreases, it becomes possible to suppress the torque change at the time point of switching.

In addition, the target torque reduction ratio at the time of switching KTDWNTGT that should be achieved by the ignition timing retardation control is calculated, the target retardation ignition timing at the time of switching IGTGT is calculated according to the target torque reduction ratio at the time of switching KTDWNTGT, and when the retardation limit value IGLGG at the time point when the switch request is made is on the more advanced side from the target retardation ignition timing at the time of switching IGTGT, a control delaying the start timing of the intake air amount increase control is performed. When the retardation limit value IGLGG is on the more advanced side from the target retardation ignition timing at the time of switching IGTGT, it means that the ignition timing IG cannot be retarded to the target retardation ignition timing at the time of switching IGTGT. Thus, in such cases, by delaying the start timing of the intake air amount increase control, it becomes possible to suppress the change in the output torque at the time point when the switch from the all-cylinder operation to the partial-cylinder operation is executed.

In the present embodiment, the throttle valve 3 and the actuator 3a constitute an intake air amount change member, the spark plug 8 and a driving circuit thereof (included in the ECU 5) constitute an ignition member, and the ECU 5 constitutes a transient control member.

Moreover, the disclosure is not limited to the above-mentioned embodiments, but may be modified in various ways. For example, in the above-mentioned embodiments, in the internal combustion engine having six cylinders, three cylinders may be operated in the partial-cylinder operation. However, the disclosure is applicable regardless of both the number of cylinders of the internal combustion engine and the number of cylinders operated in the partial-cylinder operation.

In addition, in the above-mentioned embodiments, the retardation limit value IGLGG may be calculated using the engine rotation number NE, the exhaust gas recirculation rate REGR, and the intake temperature TA. However, a correction corresponding to the octane number RON of the fuel in use may further be performed. In such cases, the retardation limit value IGLGG is calculated so as to increase (become a value on the more advanced side) as the octane number RON decreases. Furthermore, although the retardation limit value IGLGG is desirably calculated using all of the above parameters, it may also be calculated using at least one of these parameters. The octane number RON of the fuel in use can be calculated using a known estimation method (for example, a method shown in Japanese Laid-open No. 2015-98864).

In addition, the calculation method of the delay time TDLY is not limited to the above-mentioned method; the following methods, for example, are also applicable.

1) According to a difference between the initial intake air flow rate GAIRINI and the retardation limit intake air flow rate GAIRLGG, a difference between the initial intake air flow rate GAIRINI and the target intake air flow rate at the time of switching GAIRTGT, as well as the engine rotation number NE, an arrival time calculation map is set in advance. The retardation limit value arrival time TLGG and the target intake air flow rate arrival time TTGT are calculated using this map, and the delay time TDLY is calculated as a difference between them.

2) The delay time IDLY is calculated using a map set in advance according to the engine rotation number NE and the retardable amount DRTDLGG (=IGINI−IGLGG). Since an engine operation region where the partial-cylinder operation can be executed is limited to a relatively narrow region, even with the setting corresponding to the engine rotation number NE and the retardable amount DRTDLGG, it is possible to obtain an torque change suppression effect at the time of execution of the switch. In addition, even if the delay time TDLY does not completely match a time obtained by subtracting the retardation limit value arrival time TLGG from the target intake air flow rate arrival time TTGT, it is possible to obtain the torque change suppression effect.

In addition, in the above-mentioned embodiments, it is recited that the switch request for switching from the all-cylinder operation to the partial-cylinder operation is made when in the cruise state in which the vehicle travels at a relatively low and nearly constant vehicle speed. However, there may also be a configuration in which the switch request is made based on, for example, information obtained from a navigation device or the road conditions, predictable future operation conditions (including the vehicle's operation state and road conditions).

In addition, in the above-mentioned embodiments, the ignition timing at the time of the switch request is applied as the initial ignition timing IGINI. However, the ignition timing IG when the target torque TRQCMD is substantially the same as the target torque TRQCMD at the time of the switch request may also be used as the initial ignition timing IGINI, so as to calculate the retardable amount DRTDLGG.

According to the configuration, in the case where the switch request for switching from the all-cylinder operation to the partial-cylinder operation is made, before the switch from the all-cylinder operation to the partial-cylinder operation is executed, the intake air amount increase control increasing the intake air amount of the internal combustion engine is performed, the ignition timing retardation control retarding the ignition timing is performed, and based on the retardation limit value of the ignition timing at the time point when the switch request is made, the start timing of the intake air amount increase control is changed. When a difference (i.e., a retardable amount of the ignition timing) between the ignition timing at the time point when the switch request is made and the retardation limit value is small, an increase in an engine output torque associated with an increase in the intake air amount cannot be sufficiently suppressed any more by retarding the ignition timing. In such cases, by changing the start timing of the intake air amount increase control, it becomes possible to suppress a change in the output torque at the time point when the switch from the all-cylinder operation to the partial-cylinder operation is executed.

According to an embodiment of the disclosure, the internal combustion engine includes an exhaust gas recirculation device (12, 13) recirculating exhaust gas to the combustion chamber of the cylinders. The transient control member calculates the retardation limit value (IGLGG) by using at least one of an octane number (RON) of the fuel, an intake temperature (TA), an exhaust gas recirculation rate (REGR) indicating a ratio of the exhaust gas to a total amount of gas sucked in the combustion chamber, and a rotation number (NE) of the internal combustion engine.

According to the configuration, the retardation limit value is calculated using at least one of the octane number of the fuel, the intake temperature, the exhaust gas recirculation rate and the rotation number of the internal combustion engine. Since the retardation limit value varies depending on the octane number, the intake temperature (ambient temperature), the exhaust gas recirculation rate and the rotation number of the engine, by calculating the retardation limit value by using these parameters, accidental fires that may happen due to excessive retardation of the ignition timing can be reliably prevented.

According to an embodiment of the disclosure, the transient control member calculates, as the retardable amount (DRTDLGG), a difference between the retardation limit value (IGLGG) and an initial ignition timing, and changes the start timing of the intake air amount increase control according to the retardable amount. The initial ignition timing is an actual ignition timing (IGINI) at the time point when the switch request is made, or an ignition timing when a target engine output torque is nearly the same as the target engine output torque at the time point when the switch request is made.

According to the configuration, the difference between the retardation limit value and the initial ignition timing is calculated as the retardable amount, and the start timing of the intake air amount increase control is changed according to the retardable amount. Here, the initial ignition timing is considered to be the actual ignition timing at the time point when the switch request is made, or the ignition timing when the target output torque of the internal combustion engine is substantially the same as the target output torque at the time point when the switch request is made. By calculating the difference between the retardation limit value and the initial ignition timing as the retardable amount, the retardable amount of the ignition timing at the time point when a switch request for switching to the partial-cylinder operation is made is calculated with high accuracy, and the change of the start timing of the intake air amount increase control can be properly performed.

According to an embodiment of the disclosure, the transient control member delays the start timing of the intake air amount increase control as the retardable amount (DRT-DLGG) decreases.

According to the configuration, as the retardable amount decreases, the start timing of the intake air amount increase control is delayed. Since a torque amount that can be reduced by retardation of the ignition timing decreases as the retardable amount decreases, the increase in the output torque due to the intake air amount increase control starts early, and a torque change at the time point of switching from the all-cylinder operation to the partial-cylinder operation increases. Accordingly, by delaying the start timing of the intake air amount as the retardable amount decreases, it becomes possible to suppress the torque change at the time point of switching.

According to the configuration, in the case where the switch request for switching from the all-cylinder operation to the partial-cylinder operation is made, before the switch from the all-cylinder operation to the partial-cylinder operation is executed, the intake air amount increase control increasing the intake air amount of the internal combustion engine is performed, and the ignition timing retardation control retarding the ignition timing is performed. Furthermore, the output torque reduction ratio of the internal combustion engine that should be achieved by the ignition timing retardation control is calculated, the target retardation ignition timing of the ignition timing retardation control is calculated according to the output torque reduction ratio, and when the retardation limit value of the ignition timing at the time point when the switch request is made is on an more advanced side from the target retardation ignition timing, a control delaying the start timing of the intake air amount increase control is performed. When the retardation limit value is on the more advanced side from the target retardation ignition timing, it means that the ignition timing cannot be retarded to the target retardation ignition timing. Thus, in such cases, by delaying the start timing of the intake air amount increase control, it becomes possible to suppress the change in the output torque at the time point when the switch from the all-cylinder operation to the partial-cylinder operation is executed.

What is claimed is:

1. A control device of an internal combustion engine, the internal combustion engine comprising a plurality of cylinders, an intake air amount change member for changing an intake air amount, and an ignition member performing ignition of a mixture of a fuel and air, the fuel being supplied into a combustion chamber of the cylinders, and the internal combustion engine being capable of switching between partial-cylinder operation in which some of the plurality of cylinders are operated and all-cylinder operation in which all of the plurality of cylinders are operated, wherein the control device comprises:

a transient control member which, before executing a switch from the all-cylinder operation to the partial-cylinder operation in a case where a switch request for switching from the all-cylinder operation to the partial-cylinder operation is made, performs an intake air amount increase control controlling the intake air amount change member so as to increase the intake air amount of the internal combustion engine, and performs an ignition timing retardation control retarding an ignition timing of the ignition member, wherein the transient control member changes a start timing of the intake air amount increase control based on a retardation limit value of the ignition timing at a time point when the switch request is made.

2. The control device of an internal combustion engine according to claim 1, wherein
the internal combustion engine comprises an exhaust gas recirculation device recirculating exhaust gas to the combustion chamber of the cylinders, and
the transient control member calculates the retardation limit value by using at least one of an octane number of the fuel supplied to the internal combustion engine, an intake temperature, an exhaust gas recirculation rate indicating a ratio of the exhaust gas to a total amount of gas sucked in the combustion chamber, and a rotation number of the internal combustion engine.

3. The control device of an internal combustion engine according to claim 1, wherein the transient control member calculates, as a retardable amount, a difference between the retardation limit value and an initial ignition timing, and changes the start timing of the intake air amount increase control according to the retardable amount, wherein
the initial ignition timing is an actual ignition timing at the time point when the switch request is made, or an ignition timing when a target engine output torque is the same as the target engine output torque at the time point when the switch request is made.

4. The control device of an internal combustion engine according to claim 3, wherein the transient control member delays the start timing of the intake air amount increase control as the retardable amount decreases.

5. A control device of an internal combustion engine, the internal combustion engine comprising a plurality of cylinders, an intake air amount change member for changing an intake air amount, and an ignition member performing ignition of a mixture of a fuel and air, the fuel being supplied into a combustion chamber of the cylinders, and the internal combustion engine being capable of switching between partial-cylinder operation in which some of the plurality of cylinders are operated and all-cylinder operation in which all of the plurality of cylinders are operated, wherein the control device comprises:

a transient control member which, before executing a switch from the all-cylinder operation to the partial-cylinder operation in a case where a switch request for switching from the all-cylinder operation to the partial-cylinder operation is made, performs an intake air amount increase control controlling the intake air amount change member so as to increase the intake air amount of the internal combustion engine, and performs an ignition timing retardation control retarding an ignition timing of the ignition member, wherein
the transient control member calculates an output torque reduction ratio of the internal combustion engine that should be achieved by the ignition timing retardation control, and calculates a target retardation ignition timing of the ignition timing retardation control according to the output torque reduction ratio, and
when a retardation limit value of the ignition timing at a time point when the switch request is made is on a more advanced side from the target retardation ignition timing, the start timing of the intake air amount increase control is delayed.

6. The control device of an internal combustion engine according to claim 2, wherein the transient control member calculates, as a retardable amount, a difference between the retardation limit value and an initial ignition timing, and changes the start timing of the intake air amount increase control according to the retardable amount, wherein the initial ignition timing is an actual ignition timing at the time point when the switch request is made, or an ignition timing when a target engine output torque is the same as the target engine output torque at the time point when the switch request is made.

7. The control device of an internal combustion engine according to claim 6, wherein the transient control member delays the start timing of the intake air amount increase control as the retardable amount decreases.

* * * * *